United States Patent [19]
Krueger

[11] 3,776,591
[45] Dec. 4, 1973

[54] AUTOMOBILE OPERA WINDOW INSTALLATION APPARATUS AND METHOD

[76] Inventor: Henry B. Krueger, 1105 Barbara St., Redondo Beach, Calif. 90277

[22] Filed: Aug. 18, 1972

[21] Appl. No.: 281,967

[52] U.S. Cl................ 296/146, 29/428, 52/204, 52/208, 52/212
[51] Int. Cl.............................. B60j 1/08
[58] Field of Search............. 296/146, 28 R; 52/204, 208, 212; 49/504; 115/117; 29/428

[56] References Cited
UNITED STATES PATENTS

| | | | |
|---|---|---|---|
| 2,240,586 | 5/1941 | Thompson | 296/63 |
| 2,996,767 | 8/1961 | Kobil et al. | 52/212 |
| 1,977,788 | 10/1934 | Allen | 52/208 |

FOREIGN PATENTS OR APPLICATIONS

| | | | |
|---|---|---|---|
| 934,858 | 8/1963 | Great Britain | 114/177 |

Primary Examiner—Kenneth H. Betts
Assistant Examiner—John A. Pekar
Attorney—Albert L. Gabriel

[57] ABSTRACT

The quarter panel and headliner of an automobile having openings cut therein, and the flange of a stepped outer ring is secured to the inner surface of the quarter panel. A flanged inner ring is inserted through the headliner opening and telescopes into the outer ring, adequate clearance being provided between the rings to allow for angular adjustments. The space between the telescoped rings is filled with adhesive, the vinyl roof on the automobile is secured in place within the outer ring, and a glass panel and a trim ring are installed in the step of the outer ring with adhesive to complete the installation.

7 Claims, 10 Drawing Figures

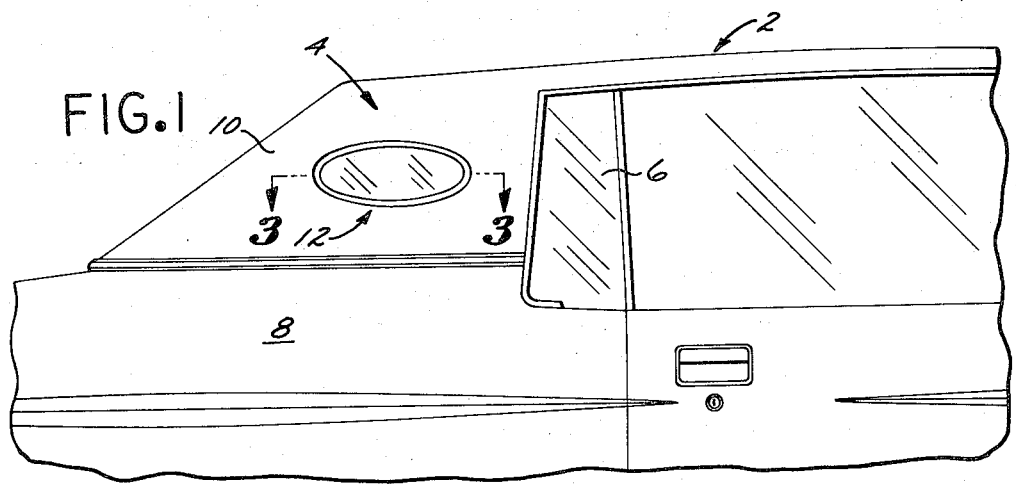
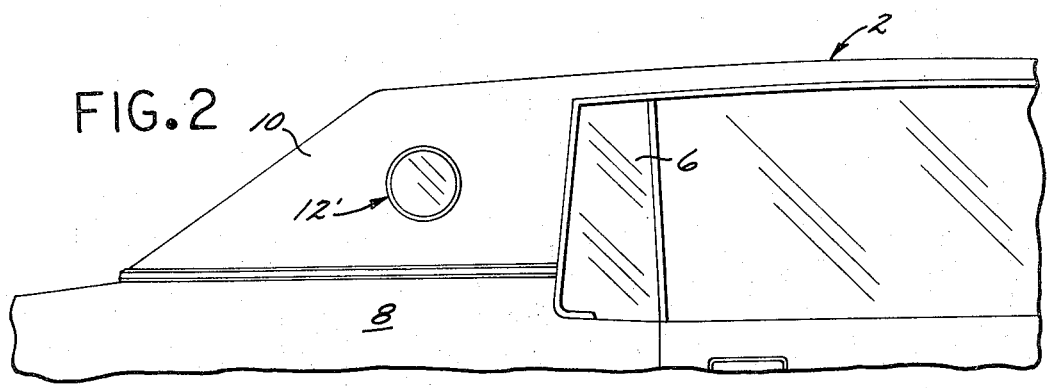
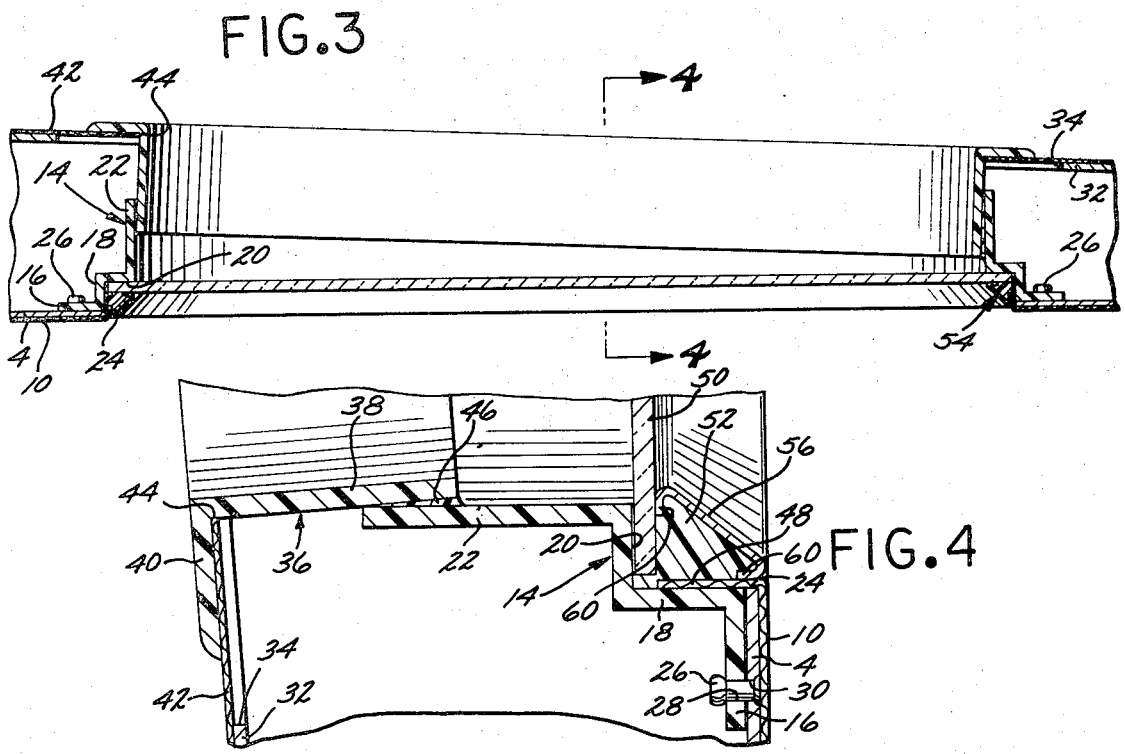

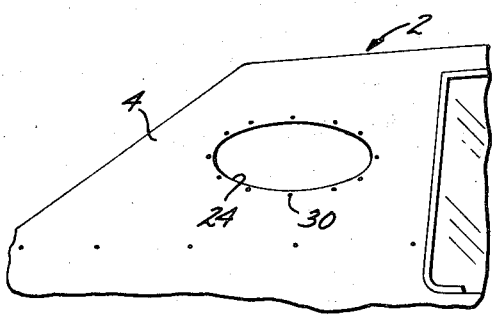
FIG.5
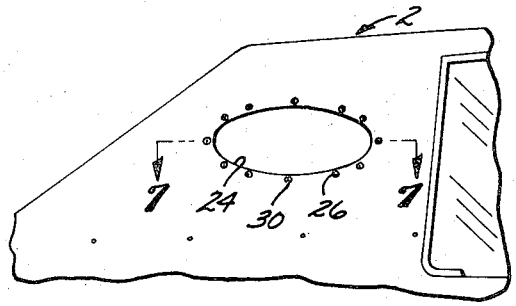
FIG.6
FIG.7
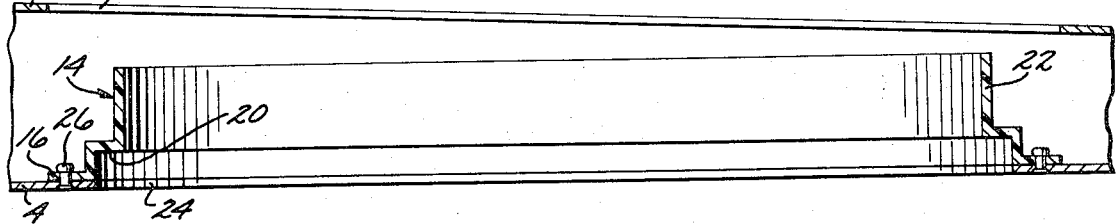
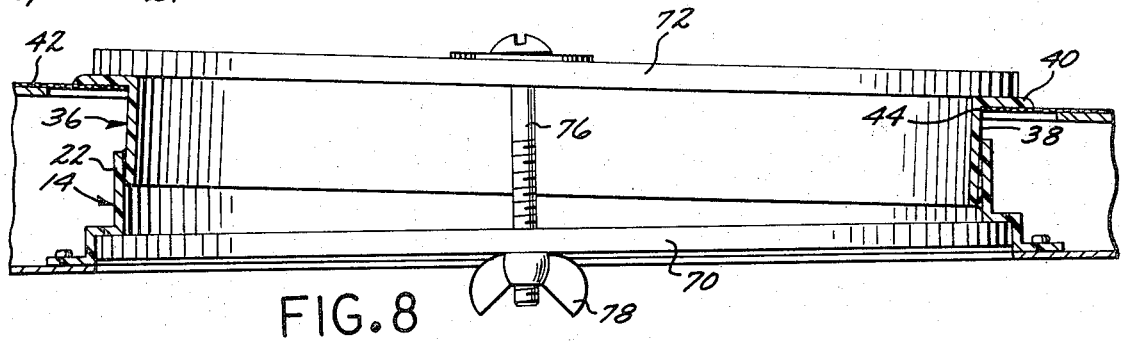
FIG.8
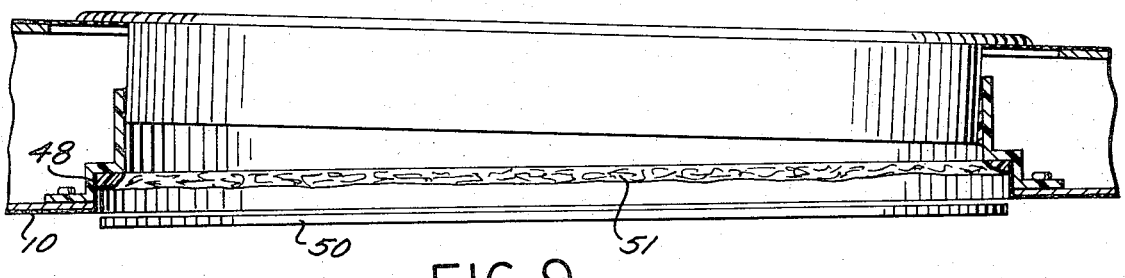
FIG.9
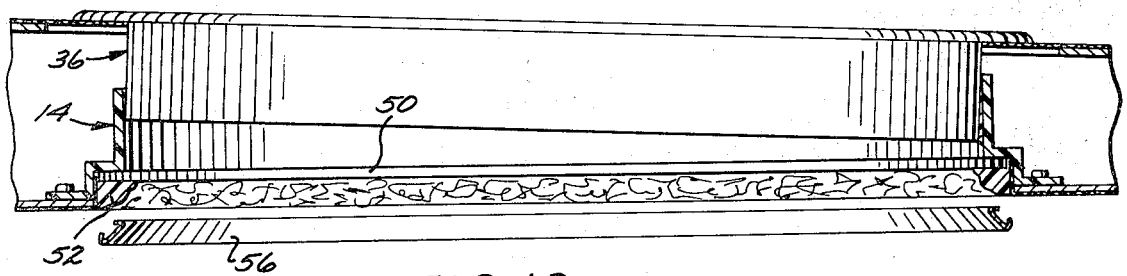
FIG.10

AUTOMOBILE OPERA WINDOW INSTALLATION APPARATUS AND METHOD

BACKGROUND OF THE INVENTION

1. Field of the Invention

The present invention relates generally to the provision of windows in automobiles, and more particularly to a method and apparatus for installing so-called opera windows in the quarter panel of an automobile.

2. Description of the Prior Art

The quarter panels of an automobile are located in the opposite rear corners of the passenger compartment, above the fenders and between the rear edge of the side windows and the panel containing the rear window. The quarter panels commonly create a vision blockage for persons riding in the automobile, and thus particularly in expensive automobiles so-called opera windows are now sometimes provided in the panels. In addition, quite often automobiles equipped with such opera windows will also have their top covered with a fabric or plastic sheet, which is secured thereto by adhesive, and which will be generically referred to herein as a vinyl roof. An automobile with a vinyl roof and opera windows is regarded as being very distinctive in appearance, and thus persons unable to afford an expensive automobile are nevertheless interested in having these distinctive features added to their vehicle.

The opera windows found in expensive automobiles are commonly factory installed, and the assembly itself is tailored by the manufacturer to a specific automobile body. Thus, such assemblies are usually unsuited for use by persons who desire to customize an automobile by adding opera windows, and indeed the assembly made for one make of automobile usually cannot be adapted for installation on an automobile made by another manufacturer.

Given the growing desire to equip a variety of automobiles with opera windows, and the general unsuitability of the windows utilized by the manufacturers of expensive automobiles for use in customizing work, there is need for a method and apparatus that can be quickly and economically employed to install such opera windows on the quarter panels of substantially any make of automobile. The present invention is directed toward satisfying that need.

SUMMARY OF THE INVENTION

The method and apparatus of the present invention are adaptable for use on many different makes of automobiles, and thus are substantially universal in nature. The apparatus includes an outer ring having a stepped interior and an external flange on its outer end, and an inner ring that is telescopically receivable within the smaller portion of the stepped outer ring with substantial clearance therebetween, the inner ring also having an external flange. The rings can have a circular or oval cross-section, whatever is preferred for the opera windows.

In practicing the method of the invention, the interior trim and headliner are removed from the automobile to expose the quarter deck, and the vinyl roof is peeled back off the panel, if one is already installed.

An opening is then cut in the quarter panel, and the flange of the outer ring is riveted or otherwise secured to the inner surface of the quarter panel. An opening is then cut in the headliner, and any necessary painting of the inner ring to match the automobile's interior color scheme is done. The inner ring is then inserted through the headliner opening, and is telescoped within the reduced portion of the outer ring.

Usually the plane of the quarter panel will not be parallel with the plane of the headliner covering the quarter panel, but rather there will be an angle therebetween. It is to accommodate this angle, and give a smooth fit on the headliner, that the inner ring is substantially smaller than the smaller end of the stepped outer ring. This difference in size is chosen to be sufficient to allow for angular adjustments over a 360° range so that nearly any automobile can be accommodated, but is not so great that it cannot be effectively sealed with an adhesive.

The next step of the method is to inject an adhesive into the space between the telescoped portions of the inner and outer rings, the inner ring then being clamped in place until the adhesive has set. Then, the edges of the vinyl roof are folded into the outer end of the stepped outer ring and secured by adhesive, following which a glass panel is seated on the step and secured by adhesive. Finally, a metallic trim ring is cemented in place over the glass panel, to complete the installation.

It is a principle object of the present invention to provide a method and apparatus for installing opera windows on the quarter panel of nearly any automobile, the method and apparatus being substantially universally adaptable, and being easily used by a person of average skill.

Another object is to provide apparatus for use in placing an opera window on the quarter panel of an automobile, which is economical to manufacture and attractive in appearance.

Other objects and many of the attendant advantages of the present invention will become more clearly understood from the accompanying drawings, when taken in conjunction with the following Description of the Preferred Embodiment.

BRIEF DESCRIPTION OF THE DRAWINGS

FIG. 1 shows the quarter panel of an automobile having a vinyl roof, and fitted with an oval opera window constructed according to the present invention;

FIG. 2 is a view similar to FIG. 1, but showing a circular opera window;

FIG. 3 is a horizontal sectional view taken on the line 3—3 of FIG. 1, showing in detail the construction of the oval opera window.

FIG. 4 is a fragmentary, enlarged sectional view taken on the line 4—4 in FIG. 3, showing in particular how the components of the apparatus are secured together by adhesive;

FIG. 5 shows the first step of the method of the invention, wherein an oval shaped opening has been cut in the quarter panel, and a series of holes have been drilled around the periphery thereof to receive mounting rivets;

FIG. 6 is a view similar to FIG. 5, but with the outer ring riveted in place;

FIG. 7 is a sectional view taken along the line 7—7 in FIG. 6, showing the stepped outer ring mounted on the quarter panel;

FIG. 8 is a view showing the headliner and the inner ring installed in position, with adhesive placed between the telescoped portions of the inner and outer rings, 3,776,591 and with clamping members holding the inner ring in position until the adhesive dries;

FIG. 9 is a view showing the vinyl roof installed and the edges thereof secured in place within the outer portion of the outer ring, with adhesive in place on the step of the outer ring to receive the glass panel; and FIG. 10 shows the final step of the method, wherein adhesive has been placed on the periphery of the glass panel, and the metallic trim ring is about to be installed to complete the installation.

DESCRIPTION OF THE PREFERRED EMBODIMENT

Referring now to the drawings, an automobile is indicated at 2 in FIG. 1, and includes a quarter panel 4 located behind the rear window 6, above the fender 8. The top of the automobile 2 has a vinyl roof 10 secured thereto by adhesive, and the quarter panel 4 carries an oval opera window 12 constructed according to the present invention.

It is to be understood that the shape of the opera window is largely a matter of personal taste, and that such can be oval as in FIG. 1, or circular, as shown at 12' in FIG. 2.

Referring now to FIGS. 3 and 4, the opera window 12 of FIG. 1 is seen to include an outer ring 14 having an external flange 16, and a stepped ring portion that includes a large outer portion 18, a radial flange or step 20, and a smaller inner portion 22. The flange 16 of the outer ring 14 is fitted against the inner surface of the quarter panel 4 about an oval opening 24 cut therein, the outer ring being secured to the panel 4 by rivets 26 passed through aligned openings 28 and 30 provided in the flange 16 and the panel 4, respectively.

In addition to the quarter panel 4, the top of a standard automobile will also normally have some interior metal 32 spaced from the panel 4. Such interior metal must be cut away to provide an opening 34 therein of a size to accept the flange 16 on the outer ring 14, so that such can be passed therethrough for mounting on the quarter panel 4.

The opera window assembly 12 also includes an inner ring 36, comprising a ring portion 38 of substantially uniform dimension and having an external flange 40 on the outer end thereof. The inner and outer rings 36 and 14 can be made of any suitable material, but are preferably molded from plastic, and the inner ring portion 38 has substantially smaller external dimensions than the internal dimensions of the reduced portion 22 of the outer ring 14. This difference in dimensions between the two rings 14 and 36 allows the plane of the flange 40 to be canted relative to the plane of the flange 16, whereby to accommodate for different orientations found from automobile to automobile between the plane of the headliner 42 and the plane of the quarter panel 4.

The headliner 42 is mounted within the interior of the automobile 2, and constitutes the interior finish thereof. In order to accommodate the inner ring 36, the headliner 42 has an opening 44 cut therein of a size to slidingly receive the ring portion 38, the inner ring 36 being canted when installed so that the flange 40 engages the headliner 42 about the opening 44 to provide an attractive appearance.

The inner and outer rings 36 and 14 are secured together by an adhesive 46 injected into the space between the telescoped portions thereof, and allowed to harden. While the adhesive selected is a matter of choice, a silicone adhesive like that commonly used in automotive window work should be employed.

The vinyl roof 10 has a hole cut therein to overlie the opening 24 in the quarter panel 4, and the edges 48 of said vinyl roof lying about the opening cut therein are folded inwardly to overlie the inner surface of the outer ring 14 and are glued in place with adhesive. A glass panel 50 is secured to the step 20 of the outer ring 14 by adhesive, and an annular body 52 of adhesive is placed around the outer periphery of the glass panel 50 to seal the same, and to secure in place an annular trim ring 54 made of metal, and including a tapered main portion 56 having inturned flanges 58 and 60 thereon that engage the adehsive body 52 and interlock therewith.

The size of the opera window 12 is of course a matter of choice. However, in order to provide a better understanding of the invention, a typical inner ring 36 for an oval window 12 will have a flange 40 measuring about 14 inches wide by about 6¼ inches in height, and the ring portion 38 thereof will measure about 12½ inches wide by about 5 inches in height, with a length of about 1½ inches. The spacing between the inner ring portion 38 and the smaller portion 22 of the outer ring 14 will vary, and must be sufficiently great to allow adequate canting of the flange 40 over 360°, while not so great as to prevent effective adhesion and sealing by the adhesive 46. A spacing of about one-sixteenth of an inch for the example just described has been found acceptable, and adequate to provide proper canting of the flange 40.

Turning now to FIGS. 5–10 in particular, the method of the present invention will be described. It is to be understood that the opera window 12 (or 12') can be installed on an automobile 2 already equipped with a vinyl roof 10, or to which such a roof is to be applied in conjunctionn with the installation of the window. In the first instance, the first step of the method is to peel back the vinyl roof, to expose the exterior surface of the quarter panel.

Access must be had to the interior of the quarter panel 4 also, and thus also in the first step of the method the interior trim and the headliner are removed from the automobile.

With access being had to the interior and the exterior of the quarter panel, the first step of the method is completed. In the second step the opening 24 is cut in the quarter panel 4 to accommodate the outer ring 14. In cutting the opening 24, such must be so positioned as to be rearward enough of the rear side window 6 that the mechanical operation thereof is not interfered with in any respect. The opening 24 will normally be cut from outside the panel 4, using metal shears.

Metal 32 inside the panel 4 is then cut away, as with an air chisel, to provide an opening 34 of sufficient size to allow the flange 16 to be passed therethrough, and rivet holes 30 are drilled around the periphery of the opening 24, using a suitable template. In the next step of the method the outer ring 14 is installed with the rivets 26, a silicone adhesive being placed between the flange 16 and the inner surface of the quarter panel 4.

The assembly at this stage of the method appears as in FIGS. 6 and 7, and the edge of the opening 24 is then ground so that it will not damage the vinyl roof. The next step of the method is to cut the opening in the headliner panel 42. In order to do such, the headliner is first temporarily placed back in position, and the outline of the opening 44 is then traced thereon, using the outer ring 14 as a guide. The opening 44 is then cut, and the headliner 42 is reinstalled. Following this, the inner ring 36 is installed, such having been previously painted to match the interior colors of the automobile, if such is desired.

The ring portion 38 is telescoped into the outer ring smaller portion 22, and the flange 40 is canted so that such engages the headliner 42. Then, silicone adhesive 46 is injected into the space between the two telescoped members, and the inner ring 36 is claimed in position until dry.

The manner in which the inner ring is clamped in position is shown in FIG. 8, wherein a plate 70 is placed on the step 20, and a second plate 72 is placed over the flange 40, the two plates 70 and 72 being connected by a bolt 76 having a wing nut 78 thereon that is easily tightened to exert the clamping pressure.

The next step of the method is to install the vinyl roof, so that the edges 48 thereof about an opening cut therein to accommodate the window 12 are adhesively secured within the outer ring 14. For an automobile with a vinyl roof already installed, this step merely involves cutting an opening in the peeled away portion of the vinyl, and regluing that portion in position. Usually, a contact cement is utilized for this purpose.

Where the vehicle did not originally have a vinyl roof, then in this step of the method the vinyl roof is installed.

The next step is to place the window panel 50 in position, and to do this silicone adhesive 51 is first spread on the step 20, after which the panel 50 is pressed into position. Then, a mass 52 of the silicone adhesive is placed about the periphery of the glass panel, to insure proper sealing thereof, and to secure the metallic trim ring 56, which is thereafter installed as the final step of the method. Of course, any excess adhesive must then be cleaned away.

From the foregoing, it it seen that a method and apparatus have been provided whereby opera windows can be easily installed on nearly any automobile, readily and with a resultant window that is very attractive in appearance.

Obviously, many modifications and variations of the present invention are possible.

I claim:

1. An opera window for installation on the quarter panel of an automobile, said quarter panel having an opening cut therein, and said automobile having a headliner therein spaced from said quarter panel and provided with an opening in alignment with said panel opening, said opera window incuding: an outer ring having an external flange thereon, said flange being attachable to the interior of said quarter panel about said opening therein; means for attaching said external flange of said outer ring to said quarter panel; and inner ring having an external flange thereon, said inner ring being substantially smaller in diameter than said outer ring and being insertable through said opening in said headliner to loosely telescope within said outer ring, whereby said inner ring is substantially universally adjustable within said outer ring over a range of angular positions until said external flange on said inner ring abuts with said headliner; means for securing said telescoped portions of said inner and outer rings together, effective in substantially any angular position of said inner ring within said outer ring; and a glass panel, said glass panel being mountable within said outer ring.

2. An opera window as recited in claim 1, wherein said outer ring is stepped, and said glass panel is seatable on said step.

3. An opera window as recited in claim 1, wherein said means for securing together said telescope portions of said inner and outer rings is an adhesive.

4. An opera window as recited in claim 1, including additionally an annular trim ring securable within said outer ring over the periphery of said glass panel.

5. An opera window as recited in claim 1, wherein said inner and outer rings and said glass panel are oval.

6. An opera window as recited in claim 1, wherein said inner and outer rings and said glass panel are circular.

7. An opera window for installation on the quarter panel of an automobile, said quarter panel having an opening cut therein, and said automobile having a headliner therein spaced from said quarter panel and provided with an opening in alignment with said panel opening, said opera window including: a stepped outer ring having an external flange thereon, said flange being attached by rivets to the interior of said quarter panel about said opening therein; an inner ring having an external flange thereon, said inner ring being insertable through said opening in said headliner to loosely telescope within said outer ring, until said flange thereon abuts with said headliner; adhesive placed between the telescoped portions of said inner and outer rings to secure such together; a glass panel seatable upon said step in said outer ring; adhesive between said glass panel and said step for securing said glass panel in position; a mass of adhesive placed about the periphery of said glass panel within said outer ring, and serving to seal said glass panel; and a trim ring received within said outer ring, and pressed into said mass of adhesive for securing the same in position.

* * * * *